United States Patent [19]
Hasegawa et al.

[11] Patent Number: 6,051,643
[45] Date of Patent: Apr. 18, 2000

[54] RESIN COMPOSITE AND METHOD FOR PRODUCING THE SAME

[75] Inventors: Naoki Hasegawa; Masaya Kawasumi; Arimitsu Usuki; Akane Okada, all of Aichi-ken, Japan

[73] Assignee: Kabushiki Kaisha Toyota Chuo Kenkyusho, Aichi-gun, Japan

[21] Appl. No.: 09/084,313

[22] Filed: May 26, 1998

[30] Foreign Application Priority Data

May 26, 1997 [JP] Japan ..................................... 9-152854

[51] Int. Cl.[7] ................................. C08K 3/34; C08K 9/00
[52] U.S. Cl. ......................... 524/445; 524/447; 524/449; 523/209; 523/216
[58] Field of Search .................................... 524/445, 447, 524/449; 523/207, 209, 210, 216

[56] References Cited

U.S. PATENT DOCUMENTS

| | | | |
|---|---|---|---|
| 5,143,819 | 9/1992 | Mirle et al. | 430/286 |
| 5,362,806 | 11/1994 | Ebner et al. | 525/73 |
| 5,385,776 | 1/1995 | Maxfield et al. | 428/297 |
| 5,407,784 | 4/1995 | Berrier et al. | 430/287 |
| 5,747,560 | 5/1998 | Christiani et al. | 524/445 |

FOREIGN PATENT DOCUMENTS

| | | |
|---|---|---|
| 62-74957 | 4/1987 | Japan . |
| 1-198645 | 8/1989 | Japan . |
| 8-333114 | 12/1996 | Japan . |

*Primary Examiner*—Peter A. Szekely
*Attorney, Agent, or Firm*—Oblon, Spivak, McClelland, Maier & Neustadt, P.C.

[57] ABSTRACT

A resin composite comprising an organophilic clay and an ionomer resin is provided. The organophilic clay is dispersed in the ionomer resin to have excellent mechanical properties. A method for producing a resin composite comprises the steps of adding an organophilic clay to an ionomer resin, melting the mixture of the clay and the ionomer resin by heating and shearing the mixture.

30 Claims, 6 Drawing Sheets

FIG. 4A

11 —|— COO⁻ M⁺ —|— COO⁻ M⁺ —|— COO⁻ M⁺
     10              10              10

FIG. 4B

11 —|— COO⁻ M²⁺ ⁻OOC —|— COO⁻ M²⁺ ⁻OOC —|—
        10              11        10         11

HIMIRAN 1554

RESIN COMPOSITE AND METHOD FOR PRODUCING THE SAME

BACKGROUND OF THE INVENTION

1. Field of the Invention

The present invention relates to a resin composite for improving the mechanical properties such as modulus of elasticity and a method for producing the same.

2. Description of the Related Arts

Attempts have been made to add and mix a clay to an organic polymer material for the purpose of improvement in its mechanical properties. For example, methods for dispersing clay in nylons, vinylic polymers, a thermosetting polymer such as epoxy resins or in rubbers have been disclosed (Japanese Laid-Open Patent Publication No. 62-74957, No. 1-198645, etc.). In these arts, the following methods are used to disperse the clay: rendering the clay compatible with an organic material by using an organic onium ion to start the polymerization of the monomer between layers of the clay; combining the clay with a growth seed; and inserting a polymerized material between interlayer sections of clay by kneading them together.

However, a clay composite obtained by any of the conventional methods described above suffered from the poor affinity of the clay with a non-polar polymer. Accordingly, the non-polar polymer was not readily intercalated between the layer of the clay for the purpose of expanding the layer. Therefore, it was difficult to disperse the clay uniformly throughout the non-polar polymer.

In order to overcome such problems, we previously proposed, as shown in FIG. 8, to derivatize a clay 7 by means of an organic onium ion 6 into an organophilic clay 3, which is then dispersed in guest molecules 91 having polar groups 910 (Japanese Laid-Open Patent Publication No. 8-333114).

Nevertheless, the guest molecule having an ionic group such as an ionomer resin failed to give sufficient dispersion and satisfactory improvement in mechanical properties.

SUMMARY OF THE INVENTION

In view of the foregoing, it is an object of this invention to provide a resin composite comprising: an organophilic clay; and an ionomer resin. Since ionic crosslinking points of the ionomer resin are highly affinitive with the organophilic clay, the organophilic clay is uniformly dispersed in the ionomer resin. Further, as molecular motion of the ionomer resin is prevented by the organophilic clay, mechanical properties of the resin composite can be highly improved.

The organophilic clay 3 referred to here is a clay (clay mineral) which is derivatized organically by means of an ionic bond of an organic onium ion 6 with the surface of a clay 7 (see FIG. 5). In other words, the organophilic clay is clay which is treated with organic compounds so that the organic compounds could be adsopted or bound or the surface of the clay. Organic onium ions are preferably employed as the organic compound.

In producing a resin composite, a method comprises the steps of:

adding an organophilic clay to an ionomer resin;

melting the mixture of the clay and the ionomer resin by heating; and shearing the mixture.

In the method according to the present invention, the treatment described above serves to provide a resin composite having excellent mechanical properties. Especially, the mechanical properties such as modulus and strength are improved.

Further, since an organophilic clay undergoes fine-dispersion throughout the matrix of an ionomer resin, an resin composite having a high gas barrier ability can be obtained.

These advantages may be achieved because of the following possible reasons.

Thus, as shown in FIG. 1, an ionomer resin 1 is a polymer which has ionic groups 10 in a side chain or a main chain of a polymer 11 (for example, $COOH^-$ group and a metal ion ($M^+$)). In the ionomer resin 1, ionic groups 10 aggregate to form an ionic crosslinking.

As shown in FIG. 2, the ionomer resin 1 having ion crosslinking points 100 is admixed with an organophilic clay 3 having a multi-layer structure and gets intercalated into the layers of the organophilic clay 3 thereof. Since the ion crosslinking points 100 of the ionomer resin 1 are highly affinitive with the surfaces of the organophilic clay 3, the ionomer resin is held stably between the layers of the organophilic clay 3. As a result, an intercalation compound 4 having the ionomer resin 1 sandwiched between the layers of the organophilic clay 3 is obtained.

Subsequently, by subjecting the intercalation compound 4 to a shearing force, the silicate layers of the organophilic clay 3 are dispersed on a molecular level. As a result, a resin composite 5 having the organophilic clay 3 dispersed uniformly in the ionomer resin 1 as shown in FIG. 3 can be obtained.

Molecular motion of the ionomer resin 1 is prevented by the organophilic clay 3. Accordingly, the resin composite 5 having excellent mechanical properties can be obtained.

As described above, the present invention provides a resin composite which has excellent mechanical properties and contains an organophilic clay dispersed uniformly therein, and a method for producing the same.

BRIEF DESCRIPTION OF THE DRAWINGS

FIG. 4 is an explanatory view showing types of ionomer resins in the present invention.

DETAILED DESCRIPTION OF THE INVENTION

Figure 1:
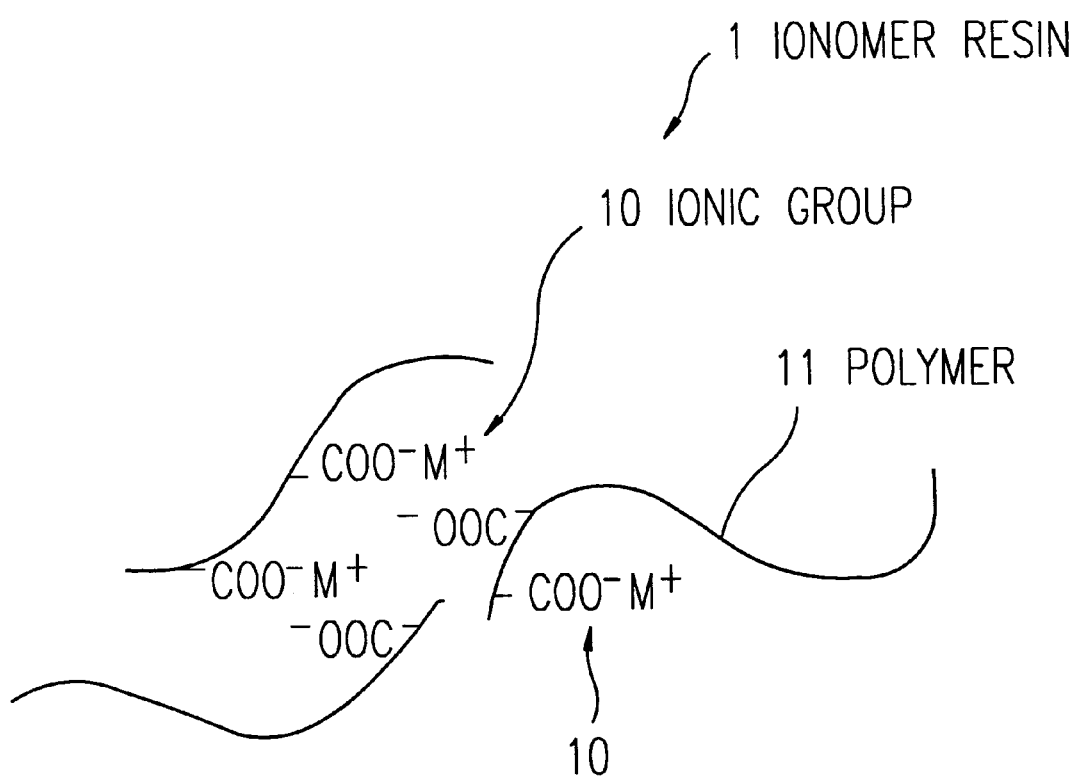
FIG. 1 is an explanatory view of an ionomer resin according to the present invention.

An ionomer resin means an ion-containing polymer having an ion in the side chain or in the main chain of the polymer. As shown in FIG. 4, examples of such ionomer resins are those of a side chain type having side-chain ionic group ($COO^-M^+$) 10 partly in the main chain of a polymer 11 (FIG. 4 (a)), a telechelic type in which cations (such as metal ion $M^{2+}$) are inserted between the polymers 11 or oligomers having anionic groups (such as carboxylic groups) on their both terminals whereby neutralizing and establishing the chain (FIG. 4 (b)), and a ionene wherein anions $X^-$ are bound to cations $N^+$ present in the main chain of the polymer 11 (FIG. 4 (c)).

Various ionomer resins are available depending on various combinations of polymers with their counterions.

A polymer is generally hydrophobic. Examples of the polymer which can be employed are polyethylene, polypropylene, ethylene-propylene copolymers, ethylene-butene copolymers, polybutadiene, polyisoprene, ethylene-propylene-diene copolymers, ethylene-butene-diene copolymers, acrylonitrile-butadiene copolymers, butyl rubbers, polystyrene, styrene-butadiene copolymers, polymethyl(meth)acrylate, poly(tetrafluoroethylene), polyurethane, ethylene-(meth)acrylic acid copolymers, butadiene-(meth)acrylic acid copolymers, styrene-(meth)acrylic acid copolymers and the like.

An ionic group of a polymer typically has the characteristics of an ionic bond. Accordingly, an ionic aggregation is formed in a hydrophobic polymer matrix. Especially in the case where the ionic groups consist of a divalent metal ion and an anionic group, a crosslinking is formed readily between the molecular chains, resulting in an ionic aggregation.

Examples of the ionic group which can be employed are anionic groups such as carboxylate ($COO^-$), sulfonate ($SO_3^-$) and phosphonate ($PO_3^-$) as well as cationic groups such as ammonium salt, pyridinium salt and phosphonium salt.

As the counterions to the anionic ion groups listed above, alkaline metal ions such as $Li^+$, $Na^+$, $Rb^+$ and $Cs^+$, alkaline earth metal ions such as $Mg^{2+}$, $Ca^{2+}$, $Sr^{2+}$, $Ba^{2+}$ and $Al^{3+}$ and transition metal ions such as $Zn^{2+}$, $Cu^{2+}$, $Mn^{2+}$, $Ni^{2+}$, $Co^{2+}$, $C^{3+}$, $Fe^{3+}$ and $Cr^{3+}$ can be employed. An organic ammonium salt represented by general formula $NH_mR_n^+$ (wherein R is an alkyl group and m+n=4), organic ammonium salts such as ethylene diamine and 1,3-bis(aminomethyl cyclohexane) (BAC), or ammonium ($NH^{4+}$) may also be employed.

Examples of the counterions to the cationic ion groups listed above are anions such as $Cl^-$, $Br^-$ and $I^-$.

The content of an ionic group in an ionomer resin is favorably within the range from 0.05 to 50 mol %. This range enables to improve the dispersibility of an organophilic clay in an ionomer resin. With a content less than 0.05 mol %, it may be difficult to finely disperse the organophilic clay. With a content exceeding 50 mol %, the viscosity of an ionomer resin may become too high, which may cause a poor moldability.

The content of an ionic group in an ionomer resin is more favorably within the range from 0.1 to 30 mol %. This range serves to provide a further improved dispersibility of an organophilic clay. Most favorably, the content is 0.2 to 20 mol %, with which the dispersibility of the organophilic clay is highly improved.

An ionic group may be introduced into a polymer by means of, for example, (i) copolymerization of a monomer having a functional group which serves as a precursor for the ionic group with a monomer followed by ionization, (ii) copolymerization of a monomer having the ionic group with a polymeric monomer, and (iii) modification of a polymer.

Examples of a monomer having a functional group which serves as a precursor for the ionic group employed in procedure (i) described above are acrylic acid, methacrylic acid, maleic anhydride, sulfonated styrene, phosphonated styrene and the like. Examples of a monomer having the ionic group employed in procedure (ii) described above are those obtained by ionization of the precursor monomers employed in procedure (i). A polymerizable monomer employed in procedure (i) or (ii) may be a hydrocarbon-based monomer having a double bond such as ethylene, propylene, butene, pentene, butadiene, isoprene and norbornene, a styrenic monomer such as styrene, methylstyrene and chlorostyrene, an acrylic monomer such as methyl (meth)acrylate, ethyl (meth)acrylate, propyl (meth) acrylate, butyl (meth)acrylate and acrylamide, as well as a haloganated monomer such as fluoroethylene and chloroethylene.

The modification of a polymer in procedure (iii) described above can be conducted by introduction of acrylic acid, methacrylic acid, maleic anhydride and the like into a polymer, or, sulfonation using sulfonic acid or phosphonation using phosphonic acid to introduce into a polymer a functional group serving as the precursor for an ionic group followed by ionization of this functional group.

Examples of the ionomer resin commercially available are those employing an ethylenic ionomer such as ethylene-(meth)acrylic acid copolymer as a polymer described above and Na, Zn, Mg or Zn-amine complex ion as an ion. Other commercial products employ elastic ionomers such as butadiene-acryl acid copolymer, telechelic $(COOH)^-$ polybutadiene, ethylene-methylacrylate-maleic acid, terpolymer, sulfonated EPDM, carboxylated NBR and the like, fluorinated resin-based ionomer for membrane filters such as sulfonated poly(tetrafluoroethylene), carboxylated poly(tetrafluoroethylene) and the like as the polymer described above and a metal ion as an ion.

The clay mentioned above is preferably derivatized organically by means of an ionic bond with the organic onium ion having 6 or more carbon atoms. An organic onium ion having less than 6 carbon atoms may be hydrophilic and may cause reduced compatibility with the ionomer resin. Examples of the organic onium ion which may be employed are hexyl ammonium ion, octyl ammonium ion, 2-ethylhexyl ammonium ion, dodecyl ammonium ion, lauryl ammonium ion, octadecyl ammonium ion, stearyl ammonium ion, dioctyldimethyl ammonium ion, trioctyl ammonium ion, distearyl dimethyl ammonium ion and lauric acid ammonium ion.

It is preferable to use the clay mineral having a large surface area to which an ionomer resin contacts, with which the interlayer distance of the clay mineral is sufficiently expanded. Specifically, the cation exchange capacity of a clay is preferably within the range from 50 to 200 meq/100 g. A capacity less than 50 meq/100 g may prevent sufficient exchange of the onium ion, thus failing to expand the interlayer distance of the clay mineral. On the other hand, if the capacity exceeds 200 meq/100 g, the bonding strength between the clay mineral layers becomes too high to expand the interlayer distance of the clay mineral.

Examples of such clay are smectite-based clays such as montmorillonite, saponite, hectorite, beidellite, stevensite and nontronite as well as vermiculite, halloysite and mica. They may be naturally-occurring or synthetic clays.

An organic onium ion is used favorably in an amount of 0.3 to 3 equivalents based on the ion exchange capacity of the employed clay. An amount less than 0.3 equivalent may result in difficulty in expanding the interlayer distance of the clay, while an amount exceeding 3 equivalents may cause deterioration of the employed ionomer resin, leading to discoloration of a resin composite.

More favorably, an organic onium ion is used in an amount of 0.5 to 2 equivalents based on the ion exchange capacity of the clay employed. With such an amount, the region sandwiched between the layers of the clay can further be swollen, and prevention from deterioration and color change of the resin composite can further be ensured.

The amount of an organophilic clay to be added is favorably 0.01 to 200 parts by weight per 100 parts by weight of an ionomer resin. Such an amount enables to improve the mechanical properties of a resin composite. With an amount less than 0.01 parts by weight, almost no improvement in mechanical properties due to the addition of the organophilic clay may be observed. On the other hand, an amount exceeding 200 parts by weight may cause a too high viscosity of the resin composite, resulting in a reduced moldability.

More favorably, the amount of the organophilic clay to be added is within the range from 0.1 to 100 parts by weight. With such an amount, a resin composite having well-balanced mechanical properties and moldability can be obtained. An amount of 0.1 to 30 parts by weight is particularly preferred.

The temperature at which the ionomer resin admixed with an organophilic clay is heated is preferably the softening point of the ionomer resin or higher. Such temperature allows the organophilic clay to be finely dispersed uniformly in the matrix of the ionomer resin.

The ionomer resin described above is subjected to a shearing force. The shearing force is applied to the ionomer resin described above preferably during the heating. The shearing force serves to allow the organophilic clay to be dispersed uniformly in the ionomer resin. It is especially preferable to use an extruder to give a shearing force during kneading. By such a procedure, the dispersibility of the organophilic clay can further be improved.

The resin composite obtained by the method described above may be a resin composite characterized by an organophilic clay dispersed in an ionomer resin as described above.

Figure 3:
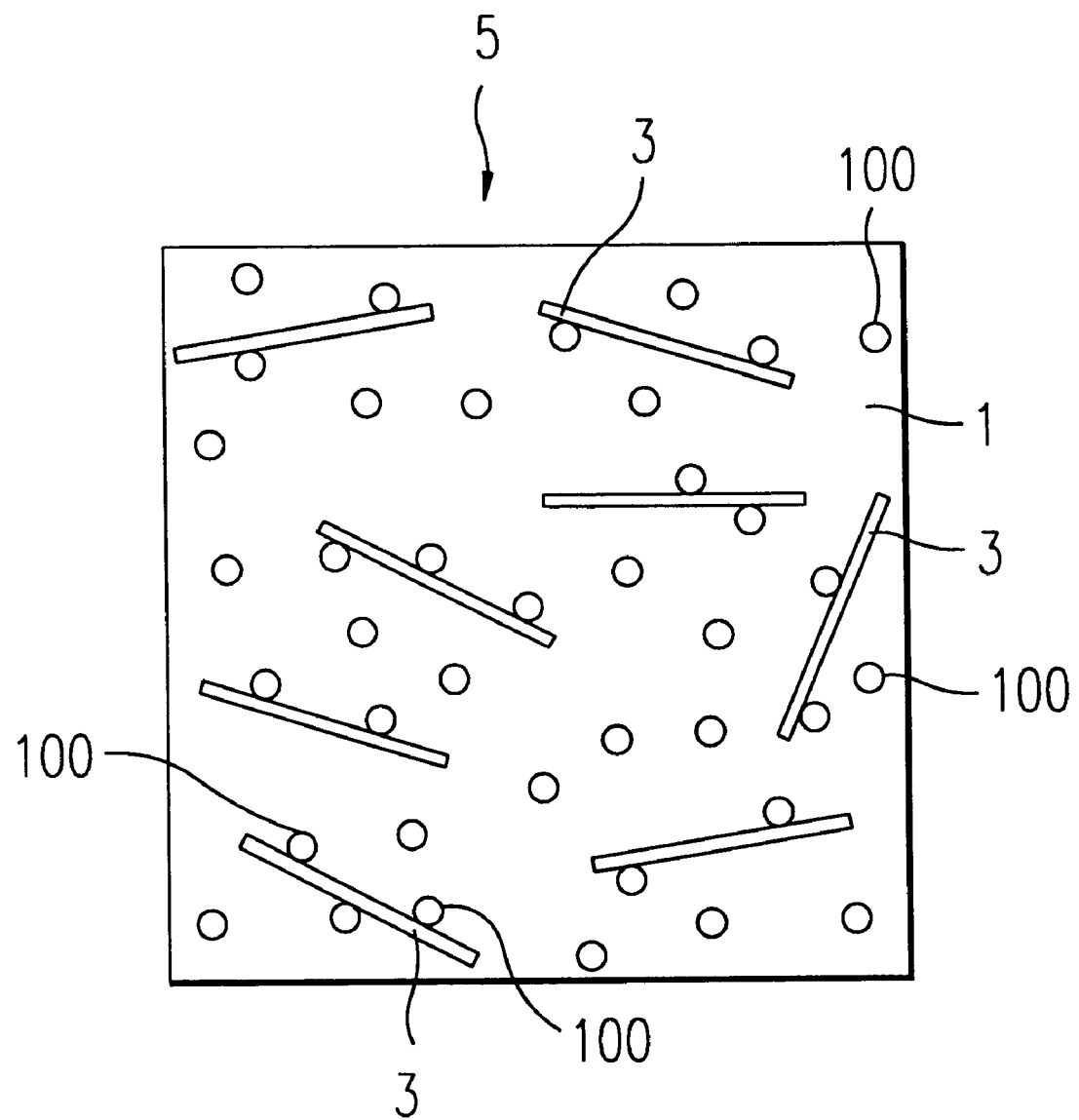
FIG. 3 is an explanatory view of the resin composite according to Embodiment 1.

Since a resin composite according to the present invention contains the organophilic clay 3 finely dispersed on a molecular level in the matrix of the ionomer resin 1 as shown in FIG. 3, it exhibits marked improvement in mechanical properties such as elastic modulus and gas barrier ability.

The size of an organophilic clay dispersed in an ionomer resin is favorably 5 $\mu$m or less. With such a size, the mechanical properties of the resin composite is improved. A size of the dispersed clay not greater than 1 $\mu$m is further preferred, and further improves the mechanical properties of the resin composite.

It is also favorable that an ionomer resin gets intercalated into the layers of an organophilic clay. With such a structure, the organophilic clay can be dispersed uniformly as monolayers to increase the ratio of the ionomer resin trapped by the organophilic clay, resulting in increased reinforcing effect of the organophilic clay.

The state that an ionomer resin gets intercalated into the layers of an organophilic clay refers to the condition in which a distance between the layers of the clay is longer than its initial distance, and such condition can be analyzed and identified by means of X-ray diffractometry.

The distance between the layers of an organophilic clay is preferably longer by 10 Å or more than that before getting intercalated into an ionomer resin. Such distance provides improved mechanical properties of the resin composite. More favorably, the distance is longer by 30 Å or more. Such distance provides further improved mechanical properties of the resin composite. Most preferably, the distance between the layers of an organophilic clay is longer by 100 Å or more than that before being getting intercalated into an ionomer resin. Such distance provides remarkably improved mechanical properties of the resin composite.

It is further favorable that the multi-layer structure of an organophilic clay is lost and the molecules of the organophilic clay 3 are dispersed as monolayers (FIG. 3). In such structure, the organophilic clay 3 crosslinks the ion aggregations (ion clusters) of the ionomer resin 1 to restrict the molecular movement of the ionomer resin 1, resulting in a great improvement in mechanical properties in spite of adding a small amount of the organophilic clay 3.

A resin composite according to the present invention may suitably be applied to injection mold articles, extrusion molded articles and films.

EMBODIMENTS

Embodiment 1

Figure 2:
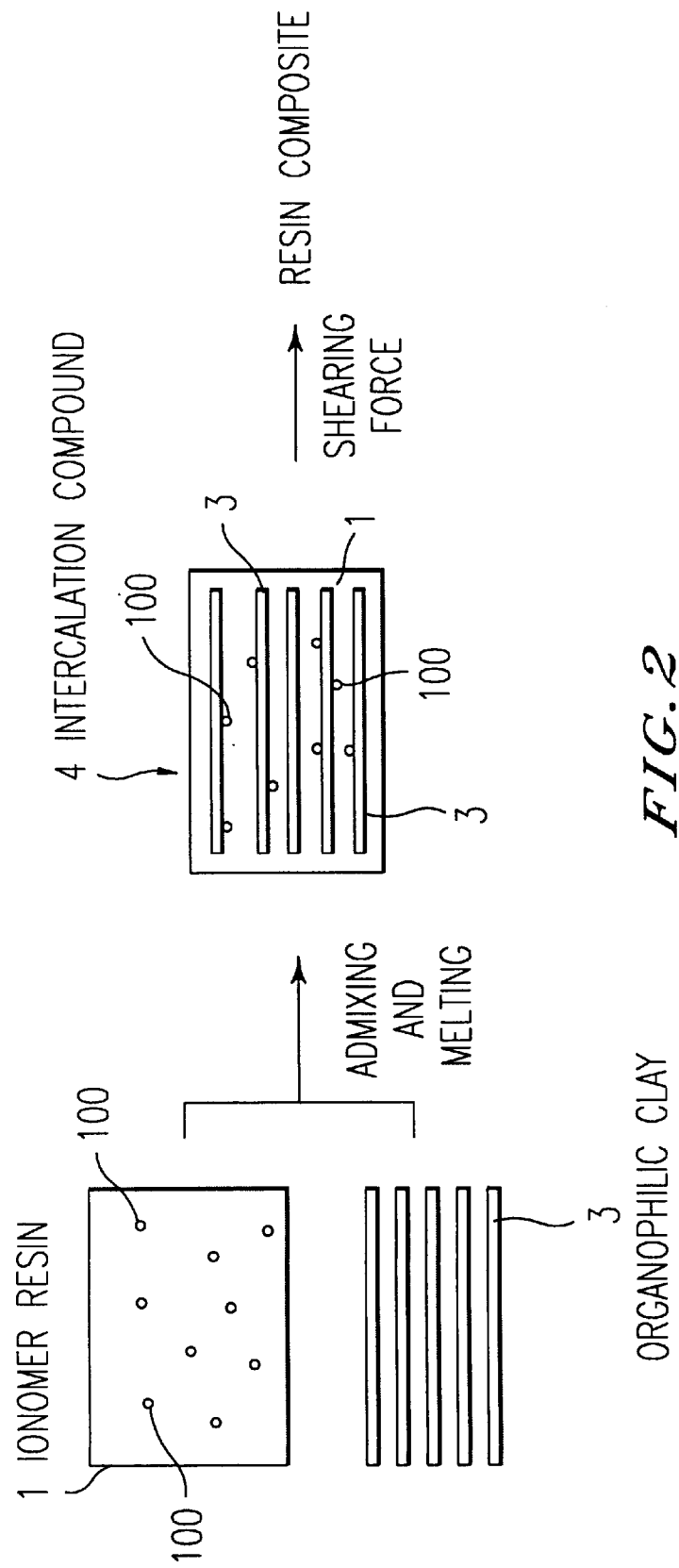
FIG. 2 is an explanatory view showing a method for producing a resin composite according to Embodiment 1.
Figure 5:
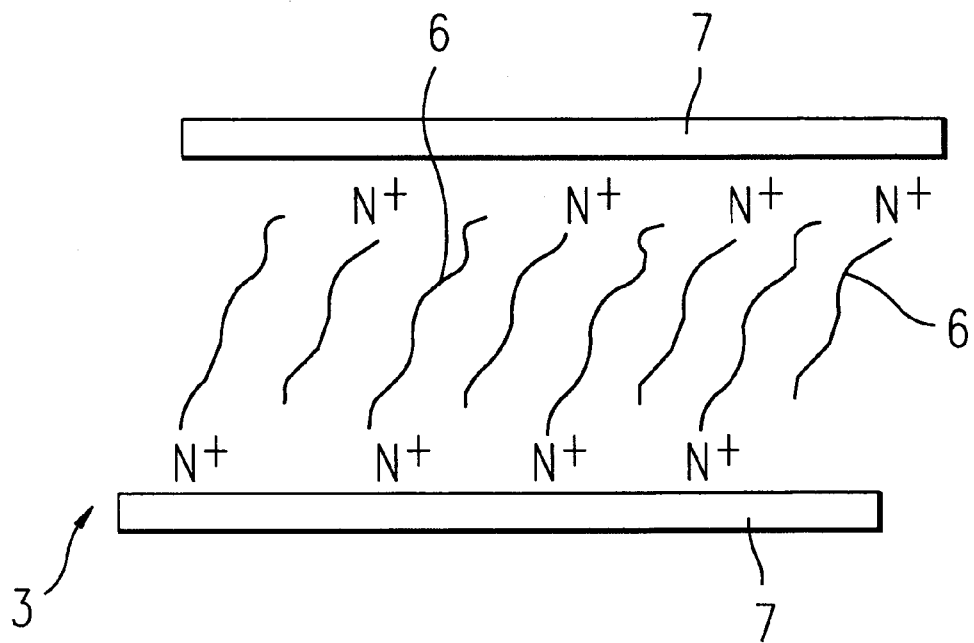
FIG. 5 is an explanatory view of an organophilic clay according to Embodiment 1.

The resin composites according to the embodiments of the present invention are illustrated referring to FIGS. 2, 3 and 5.

A resin composite 5 according to this embodiment contains an organophilic clay 3 dispersed in an ionomer resin 1 as shown in FIG. 3. This resin composite can be obtained by adding the organophilic clay 3 to the ionomer resin 1 and melting by heating while being subjected to a shearing force as illustrated in FIG. 2.

The organophilic clay is constituted of a clay 7 which is laminar and has a hydrophilic surface and to which an organic onium ion 6 is ionically-bonded, as shown in FIG. 5.

A method for producing said resin composite is described below.

Figure 6:
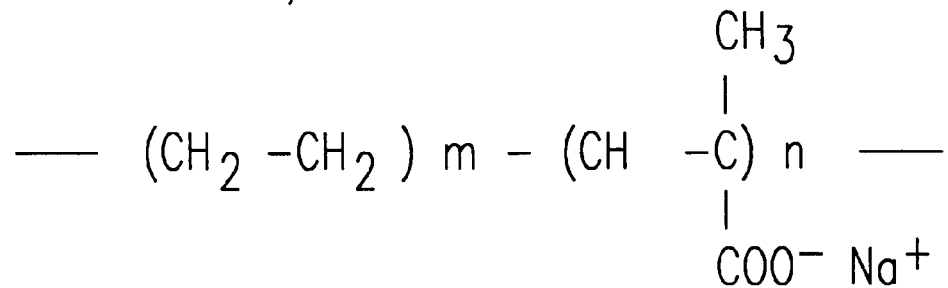
FIG. 6 is a formula showing a chemical structure of HIMIRAN 1555 and 1601 according to Embodiments 1–3.

As an ionomer resin, HIMIRAN 1555 manufactured by MITSUI DUPONT CHEMICAL CO., LTD. was provided. This resin is an ethylene-methacryl acid copolymer into which a metal ion of Na is introduced as shown in FIG. 6.

An aqueous dispersion of ammonium salt prepared from 31.1 g of stearylamine and 11.5 ml of concentrated HCl was added to an aqueous dispersion of 80 g of montmorillonite (KUNIPIA F manufactured by KUNIMINE KOGYO CO., LTD.) to obtain an organophilic clay.

Subsequently, 300 g of the ionomer resin and 8 g of the organophilic clay obtained as above were admixed, and then melted and kneaded at 150° C. using a twin screw extruder. After injection molding, a molded article of a resin composite was obtained.

The resin thus obtained was observed with a transmission electron microscope. The organophilic clay was proven to be dispersed in a size of the order of nanometer.

Further, the dynamic viscoelasticity of the resin composite was also determined to calculate the storage modulus. The storage modulus of the resin composite at 40° C. was twice higher than that containing no organophilic clay.

The composite resin was molded into a film and its nitrogen permeability was determined. The film obtained from the resin composite had the reduced permeability which was 0.66 times that of an ionomer resin containing no organophilic clay, exhibiting a high gas barrier.

Embodiment 2

In this embodiment, a resin composite was produced by increasing the amount of the organophilic clay twice larger than that used in Embodiment 1.

Thus, 16 g of montmorillonite (organically-derived by stearyl ammonium) was added to 300 g of HIMIRAN 1555, and then melted and kneaded at 150° C. using a twin screw extruder. After infection molding, a molded article of the resin composite was obtained.

The molded article thus obtained was observed with a transmission electron microscope. The organophilic clay was proven to be dispersed in the ionomer resin in a size of the order of nanometer.

The storage modulus of the resin composite at 40° C. was 3.5 times higher than that containing no organophilic clay.

Embodiment 3

The resin composite according to this embodiment employed HIMIRAN 1601 as an ionomer resin unlike to that used in Embodiment 1.

Thus, as shown in FIG. 6, HIMIRAN 1601 manufactured by MITSUI DUPONT CHEMICAL CO., LTD., which is obtained by introducing a metal ion of Na into an ethylene-methacryl acid copolymer, has the physical properties such as melt index different from those of HIMIRAN 1555 employed in Embodiment 1.

8 g of montmorillonite which was ion-exchanged with stearyl ammonium was added to 300 g of HIMIRAN 1601, and then melted and kneaded at 150° C. using a twin screw extruder.

The molded article thus obtained was observed with a transmission electron microscope. As a result, the organophilic clay was proven to be dispersed in the ionomer resin in a size of the order of nanometer.

The storage modulus of the resin composite at 40° C. was 1.8 times higher than that containing no organophilic clay.

Embodiment 4

The resin composite according to this embodiment employed HIMIRAN 1554 as an ionomer resin unlike to that used in Embodiment 1.

Figure 7:
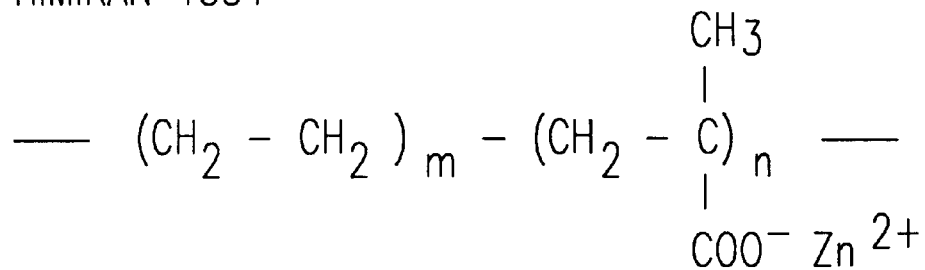
FIG. 7 is a formula showing a chemical structure of HIMIRAN 1554 according to Embodiment 4.
Figure 8:
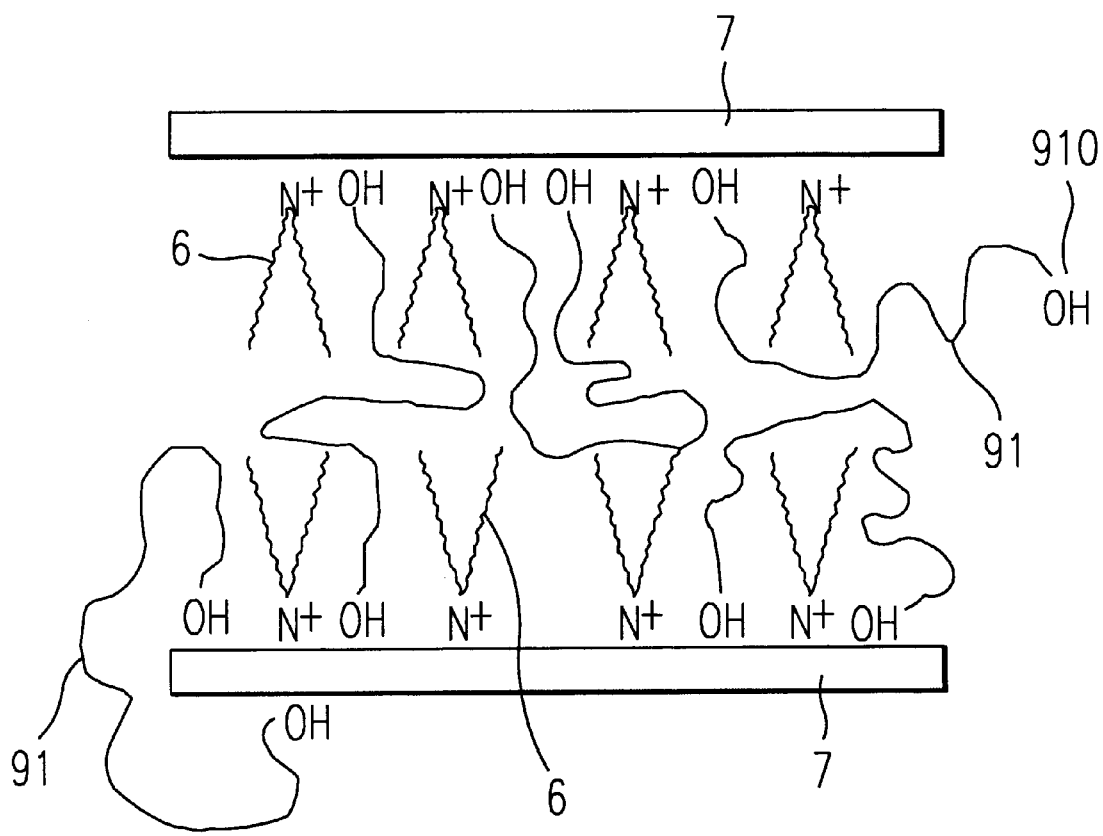
FIG. 8 is an explanatory view of a resin composite in the prior art.

Thus, as shown in FIG. 7, HIMIRAN 1554 manufactured by MITSUI DUPON CHEMICAL CO., LTD. is an ethylene-methacryl acid copolymer into which a metal ion of Zn is introduced.

Then, 8 g of montmorillonite which was ion-exchanged with stearyl ammonium was added to 300 g of HIMIRAN 1554, and then melted and kneaded at 150° C. using a twin screw extruder.

The molding article thus obtained was observed with a transmission electron microscope. As a result, the organophilic clay was proven to be dispersed in the ionomer resin in a size of the order of nanometer.

The storage modulus of the resin composite at 40° C. was 1.6 times higher than that containing no organophilic clay.

Comparative Example

In this comparative example, a resin composite was obtained by using polyethylene instead of the ionomer resin.

Thus, 8 g of montmorillonite which was ion-exchanged with stearyl ammonium was added to 300 g of polyethylene, and then melted and kneaded at 150° C. by using a twin screw extruder to obtain a molded article of the resin composite.

The molded article was observed with a transmission electron microscope. The organophilic clay was in a size of 1 mm to 10 $\mu$m in polyethylene. Polyethylene containing no ionic groups did not get intercalated into the layers of the organophilic clay and the clay was not finely dispersed therein.

The storage modulus of the resin composite at 40° C. was 1.03 times higher than that containing no organophilic clay. Namely, practically neither increase of the storage modulus nor the reinforcing effect by adding the clay was observed.

Further, the resin composite was molded into a film and its nitrogen permeability was determined. The nitrogen permeability was 1.02 times higher than that of the polyethylene, meaning not exhibiting satisfactory improvement of a gas barrier.

What is claimed is:

1. A resin composite comprising:
   an organophilic clay; and
   an ionomer resin, wherein the clay is dispersed in the resin and the ionomer resin has an ionic group content within the range from 0.05 to 50 mol % based on the ionomer resin.

2. A resin composite as claimed in claim 1, wherein the ionomer resin is an ion-containing polymer having at least one ion in the side chain and/or in the main chain of the polymer.

3. A resin composite as claimed in claim 1, wherein the ionomer resin is an ion-containing polymer having at least one anionic ion in the side chain and/or in the main chain of the polymer and its counter cation.

4. A resin composite as claimed in claim 1, wherein the ionomer resin is an ion-containing polymer having at least one cationic ion in the side chain and/or in the main chain of the polymer and its counter anion.

5. A resin composite as claimed in claim 1, wherein the ionomer resin comprises at least one side chain ionic group partly in the main chain of the polymer.

6. A resin composite as claimed in claim 1, wherein the ionomer resin is formed by polymerization between polymers and/or oligomers through a cation, said polymers and said oligomers having anionic groups on their both terminals.

7. A resin composite as claimed in claim 1, wherein the ionomer resin comprises a polymer in which at least one anion is bound to at least one cation present in the main chain of the polymer.

8. A resin composite as claimed in claim 1, wherein the organophilic clay comprises a clay which is derivatized organically by means of ionic bond of organic onium ion with the surface of said clay.

9. A resin composite as claimed in claim 8, wherein the organic onium ion comprises 6 or more carbon atoms.

10. A resin composite as claimed in claim 8, wherein the clay has cation exchange capacity ranging from 50 to 200 meq/100 g.

11. A resin composite as claimed in claim 8, wherein the organic onium ion is bonded in an amount of 0.3 to 3 equivalents based on the ion exchange capacity of the clay.

12. A resin composite as claimed in claim 1, wherein the amount of the organophilic clay to be added is 0.01 to 200 parts by weight per 100 parts by weight of the ionomer resin.

13. A resin composite as claimed in claim 1, wherein the organophilic clay is dispersed in the ionomer resin.

14. A resin composite as claimed in claim 1, wherein the organophilic clay has layered structure with interlayer distance expanded by 10 Å or more than the initial distance.

15. A resin composite as claimed in claim 1, wherein the organophilic clay is dispersed as monolayers.

16. A resin composite as claimed in claim 1, wherein the organophilic clay is dispersed in a size of 5 $\mu$m or less in the ionomer resin.

17. A method for producing a resin composite comprising the steps of adding an organophilic clay to an ionomer resin to form a mixture;

melting the mixture of the clay and the ionomer resin by heating; and shearing the mixture, wherein the clay is dispersed in the resin and the ionomer resin has an ionic group content within the range from 0.05 to 50 mol % based on the ionomer resin.

18. A method for producing a resin composite as claimed in claim 17, wherein the ionomer resin is an ion-containing polymer having at least one ion in the side chain and/or in the main chain of the polymer.

19. A method for producing a resin composite as claimed in claim 17, wherein the ionomer resin comprises at least one side chain ionic group partly in the main chain of the polymer.

20. A method for producing a resin composite as claimed in claim 17, wherein the ionomer resin is formed by polymerization between polymers and/or oligomers through a cation, said polymers and oligomers having anionic groups on their both terminals.

21. A method for producing a resin composite as claimed in claim 17, wherein the ionomer resin comprises a polymer in which at least one anion is bound to at least one cation present in the main chain of the polymer.

22. A method for producing a resin composite as claimed in claim 17, wherein the organophilic clay comprises a clay which is derivatized organically by means of an ionic bond of organic onium ion with the surface of said clay.

23. A method for producing a resin composite as claimed in claim 22, wherein the organic onium ion comprises 6 or more carbon atoms.

24. A method for producing a resin composite as claimed in claim 22, wherein the clay has cation exchange capacity ranging from 50 to 200 meq/100 g.

25. A method for producing a resin composite as claimed in claim 24, wherein the organic onium ion is bonded in an amount of 0.3 to 3 equivalents based on the ion exchange capacity of the clay.

26. A method for producing a resin composite as claimed in claim 17, wherein the amount of the organophilic clay to be added is 0.01 to 200 parts by weight per 100 parts by weight of the ionomer resin.

27. A resin composite as claimed in claim 1, wherein said range is 0.1 to 30 mol %.

28. A resin composite as claimed in claim 1, wherein said range is 0.2 to 20 mol %.

29. A method for producing a resin composite as claimed in claim 17, wherein said range is 0.1 to 30 mol %.

30. A method for producing a resin composite as claimed in claim 17, wherein said range is 0.2 to 20 mol %.

* * * * *